United States Patent [19]

Vayra

[11] Patent Number: 4,552,173

[45] Date of Patent: Nov. 12, 1985

[54] INTEGRATED CONTROL SAFETY VALVE

[75] Inventor: Jean Vayra, Meyreuil, France

[73] Assignee: Commissariat a l'Energie Atomique, Paris, France

[21] Appl. No.: 565,204

[22] Filed: Dec. 23, 1983

[30] Foreign Application Priority Data

Dec. 23, 1982 [FR] France .................. 82 21663

[51] Int. Cl.⁴ .......................................... F16K 31/122
[52] U.S. Cl. .................. 137/490; 137/489.5; 137/492.5
[58] Field of Search ............. 137/490, 489.5, 492, 137/492.5

[56] References Cited

U.S. PATENT DOCUMENTS

| | | | |
|---|---|---|---|
| 591,014 | 10/1897 | Schreidt | 137/490 |
| 2,122,706 | 7/1938 | Armstrong | 137/489.5 UX |
| 2,408,708 | 10/1946 | Tweedle | 137/489.5 |
| 2,821,996 | 2/1985 | Stevenson | |

FOREIGN PATENT DOCUMENTS 617624 2/1949 United Kingdom .
700198 11/1953 United Kingdom .
951007 3/1964 United Kingdom .

Primary Examiner—Alan Cohan
Attorney, Agent, or Firm—Oblon, Fisher, Spivak, McClelland & Maier

[57] ABSTRACT

It comprises a valve body constituted by a cylinder, defining a chamber and a seat, a valve placed in the cylinder and having a stem, a main flap and a plunger sliding in the chamber, means for elastically applying the main flap to the seat, a passage establishing a connection between the chamber and the pressurized enclosure. The passage is provided by a channel, which axially traverses the valve. A hole incorporating a metering hole links the chamber with the atmosphere.

8 Claims, 1 Drawing Figure

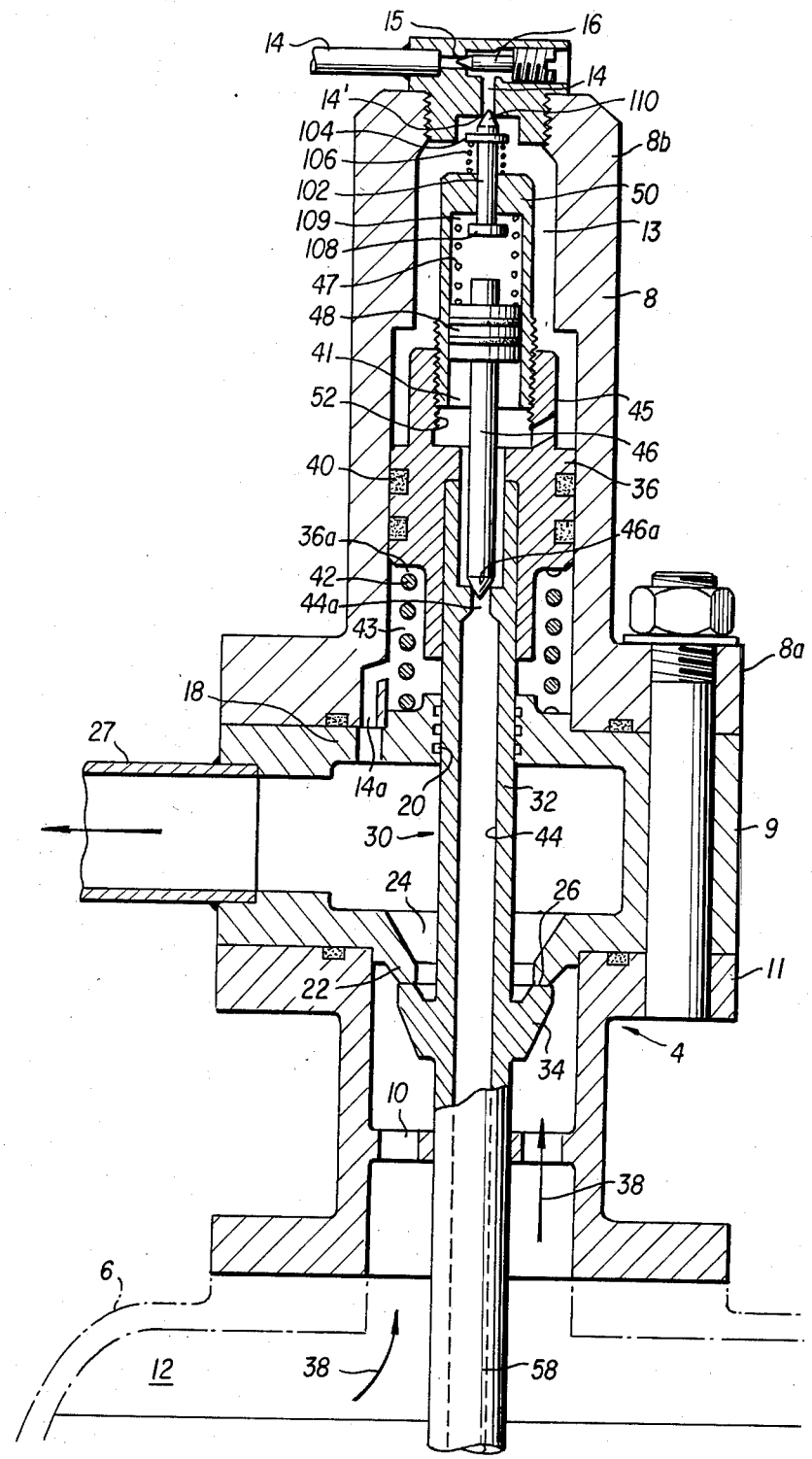

INTEGRATED CONTROL SAFETY VALVE

BACKGROUND OF THE INVENTION

The present invention relates to an integrated control safety valve, placed on an enclosure containing a pressurized fluid. It makes it possible to limit the pressure inside the enclosure. In the case of an overpressure, the valve opens, which makes it possible to discharge a fluid quantity from the enclosure and consequently limit the pressure within the same.

Safety valves, which are also called pressure relief valves, comprise a clapper, clack or flap constituted e.g. by a ball, which seals an orifice and which is kept on its seat by a bearing plunger or piston moved by a spring. The force exerted by the spring can be regulated by means of a screw, which compresses it to a greater or lesser extent. It is in this way possible to regulate the pressure from which the ball rises from its seat. Such a valve is mounted on the wall of an enclosure containing a pressurized fluid. When the pressure within this enclosure exceeds a predetermined value, the ball lifts and the fluid contained in the enclosure flows out of the same. This prevents any risk of damage, which could occur in the case of an overpressure within the enclosure.

A disadvantage of such valves is that they instantaneously react to the pressure variations prevailing within the enclosure. Thus, the flaps are released on a number of occasions, even for the purpose of discharging a very small fluid quantity. The resulting jarring can lead to a deterioration of the seat.

This problem is obviated by integrated control safety valves, which comprise a main flap, by which the fluid is evacuated from the enclosure and a control device. The opening of the main flap is controlled by the control device, which is set to the pressure value prevailing within the enclosure.

As a result of this arrangement, the control valves operate on a hit or miss basis, i.e. the main flap is either open or closed and there is no intermediate position. Thus, risks of jarring are limited and the life of the valve is increased.

The invention relates to an integrated control safety valve for an enclosure containing a pressurized fluid, the valve incorporating a valve body fixed to a wall of the enclosure, the body being provided with an inlet and an outlet for the fluid, the inlet communicating with the pressurized enclosure, whilst the outlet is to the atmosphere, said body defining a chamber linking the inlet and the outlet, a valve placed in the chamber interrupting the connection between the inlet and the outlet, whereby the valve comprises a stem, a main flap integral with the stem and able to seal a seat positioned between the inlet and the outlet and a plunger integral with this stem and sliding in the chamber, elastic means for applying the main flap to the seat, a channel passing axially through the valve, a control flap sealing the channel traversing the valve, elastic means for applying the control flap to the orifice and an orifice connecting the chamber to the atmosphere.

An integrated control valve of this type is known (GB-A No. 700,198). This valve comprises a body 5, an inlet which can be connected to a hydraulic circuit and an outlet 7 for the fluid. The upper chamber 8 and the lower chamber 9 are separated by an autoclave-type valve 12. Valve 12 has an axial passage 15 closed by a second valve 17 having a smaller passage cross-section. When this valve opens, it enables the fluid to penetrate a chamber closed by a plunger 27, which controls the opening of the valve. An orifice 65 connects the annular space 50, i.e. the chamber, with the lower chamber 9, which is connected to the discharge pipe 7. Orifice 65 has a small diameter, so as to prevent a rapid pressure drop during the control of the valve.

However, in this valve, orifice 65 remains permanently open. When there is an overpressure in the pressurized container, flap A opens and the fluid enters chamber 50. However, in view of the fact that orifice 65 remains permanently open, the fluid is simultaneously discharged by this orifice. Thus, there is a delay in the pressure rise in chamber 50, so that the opening of the main flap is also delayed. Thus, there is a time lag between the appearance of the overpressure in the enclosure and the opening of the main flap. Conversely, at the end of the overpressure, the pressure in chamber 50 drops rapidly. Thus, the auxiliary valve 17 is suddenly closed, so that there is a risk of damage to its seat.

SUMMARY OF THE INVENTION

The object of the present invention is to obviate these problems. It solves the problem consisting of producing an integrated control safety valve, in which the orifice connecting the chamber to the atmosphere opens after the main valve and closes before it.

According to the invention, this problem is solved by a metering hole and means for sealing the hole when the valve is in the closed position, said means opening after the main valve and closing before it.

According to a preferred embodiment, the means for sealing the hole in the chamber are constituted by a sealing needle member slidingly mounted on the valve, the inlet of the hole forming a seat for the said needle member, which is elastically made to bear against the seat, the needle member also having a projecting part displaced by the valve in its opening movement, so as to raise the sealing needle member from its seat when the valve opens.

The advantage obtained as a result of this invention are that when an overpressure occurs in the pressurized enclosure, the pressure in the chamber rises very rapidly. Therefore, the reaction time, prior to the opening of the main valve is reduced.

During the closing of the main valve, a fluid cushion is trapped in chamber 13, which damps the closing of the main valve. Thus, there is no risk of the seat being damaged.

According to a preferred embodiment, the control valve is constituted by a needle located in the axial channel, by a constriction formed in said passage and defining a seat for the needle.

Preferably, the valve is extended on the valve head side by a dip tube, which serves to reduce the influence of the turbulent outflow of fluid from the enclosure on the elongated needle.

DESCRIPTION OF THE DRAWING AND PREFERRED EMBODIMENT

The invention is described in greater detail hereinafter relative to a non-limitative embodiment and the attached drawing, which is a sectional view of an embodiment of the invention.

The safety valve comprises a valve body 4 fixed to wall 6, shown in broken line form, of an enclosure 12, which contains a pressurized fluid. Body 4 defines an internal volume forming a chamber. An inlet and an outlet are provided in the wall of body 4. Inlet 10 links the pressurized enclosure with the inner volume of said valve. Moreover, the body has an outlet 27, which connects its internal volume to the atmosphere. In the represented embodiment, said outlet is constituted by a pipe 27.

In its upper part, the body has a cylinder 8. End 8b is sealed and defines a cylindrical chamber 13. End 8a sealingly contacts an intermediate housing 9 which in turn sealingly contacts a lower housing 11. The cylinder 8, the intermediate housing 9, and the lower housing 11 together make up the body 4. A small cross-section hole 14 is provided in the wall of cylinder 8, so as to link chamber 13 with the atmosphere. The passage cross-section of hole 14 can be regulated by means of a screw, e.g. a set screw 16. In this way, a metering hole 15 is obtained. Beneath the end 8a of the cylinder 8, the intermediate housing 9 has a radial wall 18 with a central passage 20, as well as a second radial wall 22 with a central hole 24, whose edges form a seat 26 for the main flap of the valve.

Within the valve body 4 is provided a valve 30, which comprises a stem 32, a flap 34 integral with stem 32 and a plunger 36 integral with stem 32.

When flap 34 is applied to seat 26, the pressurized enclosure 12 is tightly sealed. However, when the flap 34 is raised from this seat, the interior of the enclosure 12 is linked with the atmosphere by means of passage holes 10, as is indicated by arrows 38, and then by pipe 27.

Plunger 36 is able to slide in cylinder 8. It has sealing means, e.g. segments 40 arranged in grooves, so as to bring about a seal between the inner wall of cylinder 8 and the plunger. Valve 30 is drawn into the closed position, i.e. upwards in the illustrated embodiment, by a return spring 42. This spring, which surrounds stem 32 bears at one of its ends on wall 18 and at its other end on the inner face 36a of plunger 36. There is also a communicating passage 14a between the annular space 43 containing spring 42 and the outlet 27. The function of channel 14a is to permit the discharge of the air contained in the annular space 43 during the opening of the valve, i.e. in its downward movement, in order not to compress the air, which would oppose the opening of flap 34.

Valve 30 is completely traversed by an axial channel 44, which links chamber 13 of the cylinder 8 with the pressurized enclosure 12. Channel 44 contains a needle 46 having a pointed end 46a.

At its other end, needle 46 has a collar or flange 48. A plug 50 is screwed into a tapped hole 52 made in plunger 36. One of the ends of a spring 47 bears on collar 48, whilst its other end bears on the interior of plug 50. It is possible to regulate the bearing force of spring 47, by screwing plug 50 to a greater or lesser extent within tapped hole 52.

The end 46a of the needle 46 seats in a reduced diameter portion 44a of channel 44 and tightly seals it. The space 41 beneath collar 48 is linked with chamber 13 by an orifice 45 provided in plunger 36.

According to the invention, the valve has means making it possible to seal hole 14 when the main flap 34 is in the closed position. These means open after the main valve 30 and close before it. In the represented embodiment, they are constituted by a needle member 102, which slides in plug 50. The needle member 102 has two collars, collar 104 which is located at the upper end of the needle member outside plug 50, whilst the other collar 108 is located at the lower end of needle member 102 within the plug 50. The needle member has a point 110, which is applied to the inlet 14' of hole 14 and which is able to seal the same. A spring 106 is positioned between the upper face of plug 50 and collar 104.

Hole 15 in the drain channel constitutes a metering hole, which can be regulated by means of screw 16. The position of needle member 102 relative to plug 50 can be regulated by washers 109, arranged around the needle member 102 between the inner face of plug 50 and collar 108. In a not shown constructional variant, the position of the needle member can be regulated by a screw and a nut mounted on a threaded part of the rod of needle member 102.

When needle member 102 is applied by spring 106 to the inlet 14' of small cross-section hole 14, chamber 13 is not linked with the atmosphere. However, annular space 43 is permanently linked to the atmosphere by channel 14a.

The safety valve according to the invention operates as follows. When an overpressure appears in enclosure 12, needle 46 is raised and provides a passage for the fluid in the container. This fluid enters chamber 13, which is closed by the sealing needle member 102. Thus, pressure rapidly rises within the chamber 13, until it exceeds the force of the calibration spring constituted by helical spring 42 in the represented embodiment and which maintains valve 30 on its seat. The flap 34 opens, the fluid in overpressure is then discharged by orifices 10, central hole 24, and pipe 27.

In its opening movement, the main value entrains needle member 102 by means of plug 50, which entrains collar 108. Point 110 is then disengaged from the inlet 14' to the hole 14, which links chamber 13 to the atmosphere.

For as long as the pressure in enclosure 12 remains above the calibrated pressure, the main flap remains open, because the metering hole 15 has been set in such a way that its passage cross-section is less than that authorized by needle 46. Thus, the pressure within chamber 13, i.e. the control pressure, remains adequate for compressing helical spring 42 and for maintaining the main flap open.

When the pressure within enclosure 12 returns to a normal value, the end 46a of the needle 46 seats in the reduced diameter portion 44a of the channel 44. The pressure within chamber 13 is reduced by the discharge of fluid through the hole 14, which leads to a closing movement of the main flap 34. During this movement, point 110 moves towards the inlet 14' of the hole 14, until it tightly seals it. This takes place just before the end of the travel of valve 30. As hole 14 is sealed, a fluid cushion damping the closure of the main flap 34 is trapped in the upper chamber 13. Thus, there is no risk of damage to seat 26.

It is pointed out that at this stage, the pressure prevailing in the chamber 13 exceeds atmospheric pressure. However, in the long run, equilibrium is reestablished, in view of the fact that the segments 40 are not absolutely tight. Thus, these segments are of the slotted type and there is a very slight leakage, so that at the end of a certain time, the pressure within chamber 13 agains becomes equal to atmospheric pressure.

If an overpressure appears in enclosure 12 before the pressure within chamber 13 has again become equal to the atmospheric pressure, the opening of the main flap is faster, in view of the fact that the opening pressure for said flap is reached more rapidly. The existence of a residual pressure in chamber 13 is consequently not a disadvantage.

The valve described hereinbefore has the advantages of controlled safety valves, i.e. of preventing jarring of the discharge means. It makes it possible to eliminate connecting ducts between the valve and the autonomous control device. The operating stability is further increased by the addition of a dip tube 58 beneath flap 34. As a result of dip tube 58, needle 46 is not exposed to the sudden pressure variations occurring in the vicinity of openings 10. The pressure to which needle 46 is sensitive is that which prevails at a point further from the discharge opening, i.e. at a point where it is more constant.

Moreover, the response time of the main flap in the case of an overpressure in the enclosure is reduced compared with a prior art valve, as a result of the fact that the control pressure controlling the opening of the main valve is reached more rapidly. During the closing of the valve, the movement of the main flap is damped and damage to the seat prevented.

What is claimed is:

1. An integrated control safety valve for an enclosure containing a pressurized fluid, the valve incorporating a valve body fixed to a wall of the enclosure, said valve body being provided with an inlet and an outlet for the fluid, the inlet communicating with the pressurized enclosure, whilst the outlet is to the atmosphere, said valve body defining a chamber linking the inlet and the outlet, a valve placed in said chamber interrupting the connection between the inlet and the outlet, said valve comprising a stem, a main flap integral with said stem and able to seal a seat positioned between the inlet and the outlet, and a plunger integral with said stem and sliding in said chamber, elastic means for applying said main flap to its seat, a channel passing axially through said valve, a control flap sealing said channel, elastic means for applying said control flap to its seat, and an orifice connecting said chamber to the atmosphere, wherein said orifice is a metering hole and means are provided for sealing said orifice when the valve is in the closed position, said means being responsive to movement of said valve so that said means opens said orifice after opening of said main flap and closes said orifice before closing of said main flap.

2. A valve according to claim 1, wherein said means for sealing said orifice comprises a sealing needle member slidingly mounted in said plunger, the inlet of said orifice forming a seat for said needle member, which is elastically made to bear against the seat, said needle member also having a projecting part displaced by said valve in its opening movement, so as to raise said sealing needle member from its seat when said valve opens.

3. A valve according to claim 1, wherein said control flap comprises a needle located in said channel so as to valve a constriction formed in said channel and defining a seat for said needle and an elastic means for applying said needle to its seat.

4. A valve according to claim 1, wherein said stem extends beyond said main flap into the enclosure, the portion of said stem beyond said main flap comprising a dip tube.

5. A valve according to claim 3, wherein said elastic means for applying said needle to its seat comprise a tapped hole made in said plunger and coaxial to said channel, a plug screwed into said tapped hole, and a spring bearing against said plug and against one end of said needle.

6. A valve according to claim 2 and further comprising means for regulating the travel of said sealing needle member.

7. A valve according to claim 6, wherein said means for regulating the travel of said sealing needle member comprise washers inserted between the projecting part and said plunger.

8. A valve according to claim 6, wherein said means for regulating the travel of said sealing needle member comprise a nut and a screw threaded into said needle member.

* * * * *